INVENTORS:
HERBERT R. GOULD,
HOWARD D. KURT,
BY Irving A. Marchman
ATTORNEY

INVENTORS:
HERBERT R. GOULD,
HOWARD D. KURT,
BY Irving H. Marshman
ATTORNEY

United States Patent Office

Re. 26,576
Reissued Apr. 29, 1969

26,576

BUSWAY DISTRIBUTION SYSTEM FOR SUPPLYING A PLURALITY OF ELECTRIC DISCHARGE DEVICES THROUGH BALLAST DEVICES

Howard D. Kurt, Lynnfield, Mass., and Herbert R. Gould, Danville, Ill., assignors to General Electric Company, a corporation of New York Original No. 3,307,072, dated Feb. 28, 1967, Ser. No. 357,078, Apr. 3, 1964. Application for reissue Oct. 31, 1967, Ser. No. 682,701
Int. Cl. H05b *41/14*
U.S. Cl. 315—177 5 Claims

Matter enclosed in heavy brackets [ ] appears in the original patent but forms no part of this reissue specification; matter printed in italics indicates the additions made by reissue.

*ABSTRACT OF THE DISCLOSURE*

*A combination ballast and light socket assembly for plug-in mounting on a busway, containing sockets for adjacent ends of aligned fluorescent lamps and required ballasts so that two lines of fluorescent lamps may be mounted on and energized from the busway with only one socket and ballast assembly between each successive pair of lamps, and no end-to-end wiring of the lamps required.*

*Field of the invention*

This invention relates to distribution systems, more particularly to starting devices and circuits for electric discharge devices supplied from busways and an object of the invention is the provision of simple, reliable and improved starting devices and circuits of this character.

*Objects of the invention*

More specifically, the invention relates to busway distribution systems in which a plurality of electric discharge devices, such as fluorescent lamps are supplied from the busway through ballast devices which are plugged into the busway at intervals, and a more specific object of the invention is the simplification of the circuitry of the ballast devices.

*Summary of the invention*

In carrying the invention into effect in one form thereof, a plug-in busway is provided which comprises a pair of alternating current supply conductors mounted in spaced apart relationship within an elongated housing. A plurality of novel plug-in ballast units are plugged into the busway at longitudinally spaced apart points. Each of the ballast units is provided with a pair of input terminals each connected to a corresponding one of the busway conductors and each unit has a first and second output terminal. Each of the ballast units comprises a transformer having a primary winding connected to be supplied from the input terminals and a secondary winding that is included in a connection between the two output terminals. A plurality of electric discharge devices such as fluorescent lamps, at least one for each interval between successive ballast units, are mounted along the busway so that one ballast unit is common to each of two adjacent discharge devices. Electrical connections are provided from the terminals of each of the electric discharge devcies to appropriate output terminals of two successive ballast units.

*Brief description of the drawings*

For a better and more complete understanding of the invention reference should now be had to the following specification and to the accompanying drawings of which.

*Description of a preferred embodiment*

Figure 1:
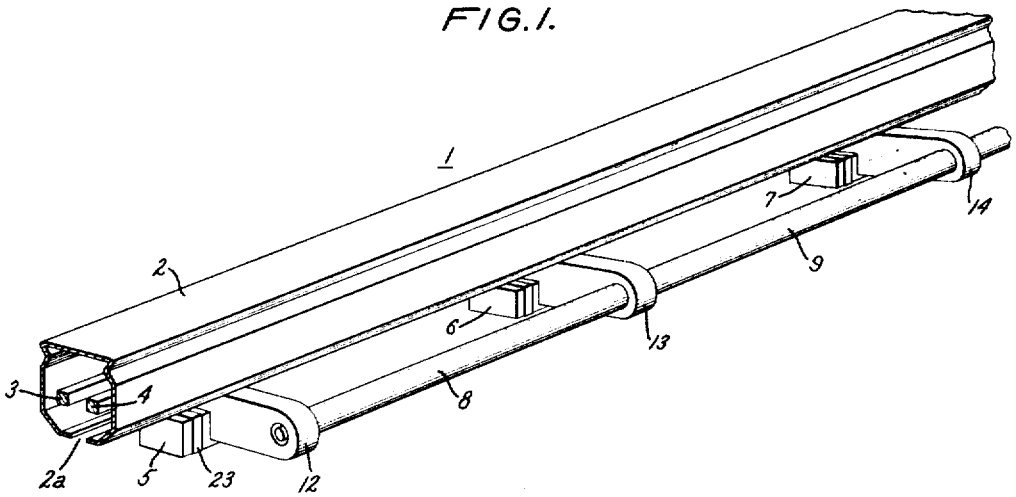
FIG. 1 is a view in perspective of a length of busway together with electric discharge devices and ballast units constituting an embodiment of the invention.
Figure 3:
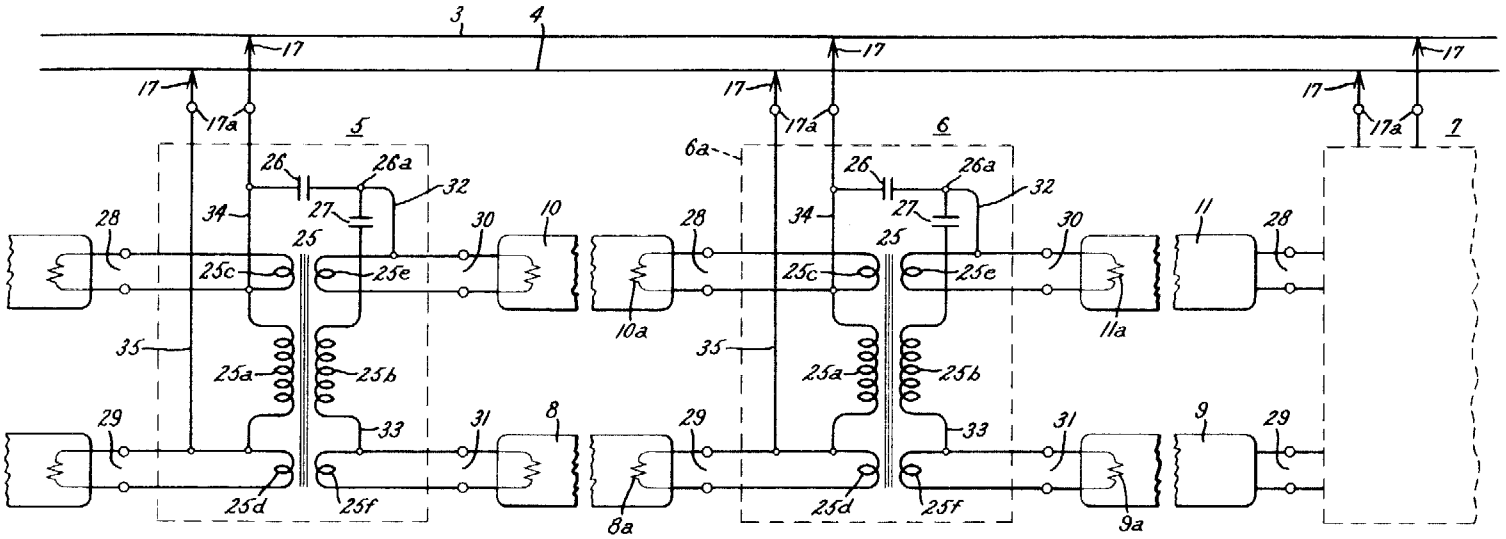
FIG. 3 is a simple schematic diagram of an embodiment of the invention and FIG. 4 is a simple schematic diagram of a modification.

Referring now to the drawings and particulary to FIG. 1, a length of busway 1 comprises an elongated housing member 2 within which two alternating current supply conductors 3 and 4 are mounted in spaced apart relationship. A plurality of plug-in ballast units 5, 6 and 7 are mounted in spaced apart relationship along the busway. Although only three ballast units are illustrated, a larger number is usually provided. The actual number employed will depend on the requirements of the installation. A plurality of electric discharge devices such as fluorescent lamps are mounted along the busway in longitudinal end to end relationship. At least one lamp is provided for each interval between two successive ballast units thereby to provide a common ballast unit for each two successive end to end mounted lamps. As shown in FIGS. 1 and 3 a lamp 8 is positioned in the interval between successive ballast units 5 and 6 and lamp 9 is positioned in the interval between successive ballast units 6 and 7. Thus the ballast unit 6 is positionally common to the two successive lamps 8 and 9. It is also electrically connected to both lamps and therefore electrically common to both. In many installations more than one lamp is provided for each interval between successive ballast units. As shown in FIG. 3 a second lamp 10 is positioned in the interval between ballast units 5 and 6 and a second lamp 11 is positioned in the interval between ballast units 6 and 7.

For the purpose of supporting lamps 8, 9, 10 and 11, a plurality of lamp holders 12, 13 and 14 are provided and additional similar holders (not shown) are provided for any additional lamps (not shown) that may be required for the installation.

Figure 2:
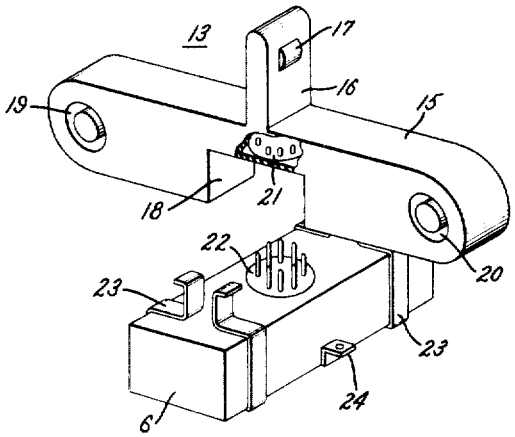
FIG. 2 is a view in perspective of certain details of the invention.

Since the lamp holders are preferably identical, only the lamp holder 13, which is typical, is described in detail. As illustrated in FIG. 2 it comprises a yoke member 15 that is made of a suitable insulation material. Yoke 15 is provided with a centrally disposed plug-in member 16 that is provided with a pair of plug-in contact connectors 17 for making electrical connection with the busway conductors 3 and 4. Only one of the contacts 17 is visible in FIG. 2, since the other is situated on the opposite side of the plug-in member 16.

The bottom wall of busway housing 2 is provided with a longitudinal slot 2a through which the plug-in member 16 may be inserted to effect contact of the connectors 17 with the busway conductors 3 and 4. A channel 18 is formed in the bottom wall of the yoke for receiving a ballast unit. Lamp sockets 19 and 20 are provided in one side wall of the yoke for receiving contact terminals on the adjacent ends of lamps 8 and 10. Similar lamp sockets (not shown) are provided in the opposite side wall of the yoke for receiving contact terminals on the adjacent ends of lamps 9 and 11.

A plug-in receptacle 21 is provided in the bottom wall of the channel 18. Electrical connections (not shown in FIG. 2) are provided between appropriate contacts of receptacle 21 and plug-in connectors 17. Also, electrical connections are provided between appropriate contacts in receptacle 21 and corresponding lamp sockets in the yoke. The ballast 6 is provided with a socket 22 that plugs into the receptacle 21. Its plug-in contacts are connected to the input and output terminals of the ballast. The ballast unit may be secured to the busway housing by means of a bracket 23. Alternatively it may be secured to the lamp holder by means of a bracket 24.

The lamps 8, 9 10 and 11 are illustrated in FIG. 3 as being of the rapid start type. They are characterized by having cathodes which can be continuously heated to electron emission at voltages below the ionization voltage of the gas or vapor within the envelope. The lamps in FIG. 3 are illustrated as having filament type cathodes.

The ballast unit 6 *which* is typical of the [ballast 5] *ballasts* illustrated in FIG. 3 is enclosed in a metal case which is represented conventionally by the broken line rectangle 6a. It comprises a transformer 25 having a primary winding 25a and a secondary winding 25b together with associated electric circuit elements including a starting capacitor 26 and a power capacitor 27. The primary winding 25a is connected through the socket 22 to the plug-in contact elements 17 which make contact with the busway conductors 3 and 4 when the plug-in member 16 is plugged into the busway. A voltage adding connection between the primary and secondary windings 25a and 25b is completed by connecting the two capacitors in series relationship between one of the input terminals 17a and one terminal of the secondary winding. The ballast unit has a pair of first output terminals 28 and 29 and a pair of second output terminals 30 and 31. Each of these output terminals has two separate contacts.

Each of a pair of filament supply windings 25c and 25d has one of its terminals connected to the contacts of a corresponding terminal of primary winding 25a and has both its terminals connected to the contacts of a corresponding one of the first output terminals 28 and 29. The transformer is also provided with a pair of isolated filament supply windings 25e and 25f. The terminals of winding 25e are connected to the contacts of second output terminal 30 and the terminals of winding 25f are connected to the contacts of second output terminal 31.

An intermediate point 26a which is preferably the common terminal of capacitors 26 and 27 is connected by means of conductor 32 to one contact of second output terminal 30. Similarly the terminal of secondary winding 25b that is remote from capacitor 27 is connected by means of conductor 33 to one contact of second output terminal 31.

As thus connected, filament windings 25c and 25d supply the filamentary cathodes 10a and 8a at the adjacent ends of lamps 10 and 8 respectively and isolated filament windings 25e and 25f supply the filaments 11a and 9a at the adjacent ends of lamps 11 and 9 respectively. The opposite ends of lamps 10 and 8 are supplied by filament windings 25e and 25f of ballast unit 5 and the opposite ends of lamps 11 and 9 are supplied by filament windings 25c and 25d of ballast unit 7. It will be noted that the ballast unit 6 is electrically common to the left hand adjacent lamps 10 and 8 and to the right hand adjacent lamps 11 and 9. Similarly each ballast unit in the succession, except the unit at either end, is electrically common to the adjacent lamps on either side.

The operation of the system of FIGS. 1 and 3 is as follows:

With the busway energized, the transformer primary windings 25a of all ballast units connected to the busway will be energized and a voltage will appear across each of the secondary windings 25b. The cathodes of all lamps connected to the ballast units will be heated for emission. Lamp 8 will have impressed on its terminals the sum of the voltages appearing across primary winding 25a of ballast unit 6 and secondary winding 25b of ballast unit 5, and conduction through the lamp will be initiated. The circuit is traced from the lower terminal of primary winding 25a of ballast unit 6 through winding 25a, conductor 34, busway conductor 3, starting capacitor 26 and power capacitor 27 in series of unit 5 secondary winding 25b, conductor 33 to second output terminal 31, through lamp 8 to first output terminal 29 of ballast unit 6. A similar circuit will be completed for lamp 9 as well as for each corresponding lamp in the system.

With conduction through lamp 8 initiated a voltage will build up across starting capacitor 26 of ballast unit 5 which is connected in parallel with lamp 10. The parallel lamp circuit is traced from the right hand terminal 26a of capacitor 26 through conductor 32 to second output terminal 30 of ballast unit 5 through lamp 10, first output terminal 28 of ballast unit 6, conductor 34 to busway conductor 3, through conductor 3 and conductor 34 of ballast unit 5 to the left hand terminal of capacitor 26. The voltage of starting capacitor 26 will cause lamp 10 to start. When this condition is reached both lamps 8 and 10 will come up to full current which will be limited by the net impedance of the leakage reactance of the secondary winding 25b in series with the power capacitor 27. Similarly all of the lamps in the system will come up to full current.

Figure 4:
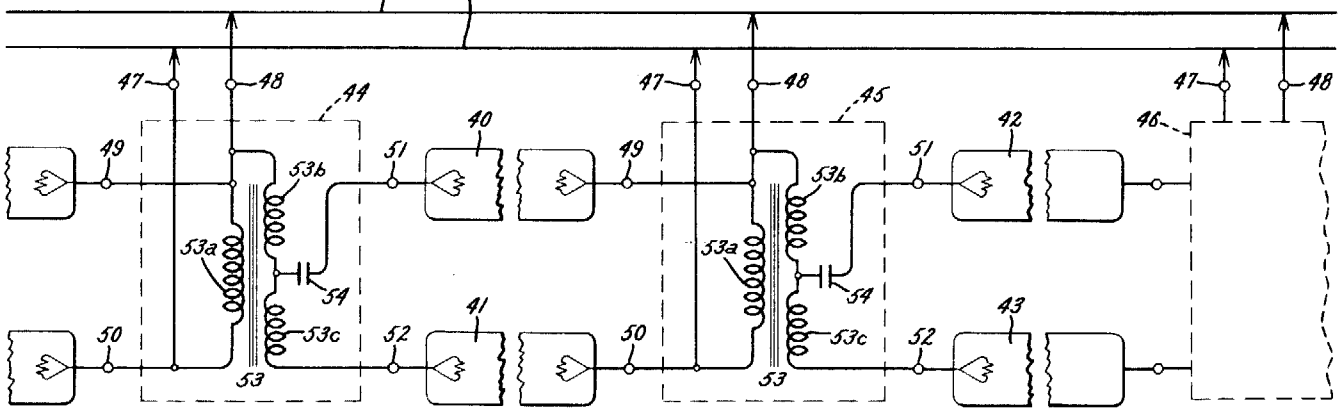

In the modification illustrated in FIG. 4, the fluorescent lamps 40, 41, 42 and 43 are of the instant start type. This type of lamp requires an instantaneously high voltage sufficient to initiate the gaseous discharge in the lamp without the necessity of heating the filaments. Ballast units 44, 45 and 46 are provided for supplying the voltages necessary to initiate and sustain conduction in the lamps. Since these ballast uints are identical, only the unit 45 will be described. It has input terminals 47 and 48, first output terminals 49 and 50 and second output terminals 51 and 52. The ballast further comprises a transformer 53 having a primary winding 53a and secondary windings 53b and 53c. These three windings are all connected in series relationship with each other.

The primary winding 53a is connected across the input terminals 47 and 48 and each of the terminals of the primary winding is connected to a corresponding one of the first output terminals 49 and 50. A power capacitor 54 is connected between the common terminal of secondary windings 53b and 53c and the second output terminal 51. The terminal of secondary winding 53c remote from the common terminal is connected to the other second output terminal 52.

The operation is as follows. With the busway conductors 3 and 4 energized, the primary winding 53a in each of the ballasts is energized and voltages appear across the secondary windings 53b and 53c of all ballast units. Conduction in the lamp 40 is initiated by the voltage induced in starting secondary winding 53b of ballast unit 44. The circuit is traced from input terminal 48 through starting winding 53b, capacitor 54, second output terminal 51, through lamp 40, first output terminal 49 of ballast unit 45 and input terminal 48 and thence through busway conductor 3 to input terminal 48 of ballast unit 44. The lamp current is limited by the series reactance of winding 53b and power capacitor 54. As a result of this, a phase shift is produced in the voltage across starting winding 53b such that the sum of the voltages of windings 53a, 53b, and 53c in series provides the voltage required to start lamp 41. With the ignition of lamp 41, the currents in both lamps 40 and 41 rise to full operating value and are limited to such operating value by the series reactance of winding 53c and capacitor 54. In a similar manner all the lamps connected to the busway through similar ballast units will be started and brought up to full operating current.

It will be noted that each of the lamps is connected between output terminals of two successive ballast units and interconnections between opposite ends of each lamp are completed through a busway conductor. It will also be noted that interconnections between a ballast unit and opposite ends of a lamp external to the busway are eliminated thereby resulting in a very desirable simplification of the circuitry and wiring.

Although particular embodiments of the invention have been shown and described it will be apparent to persons skilled in the art that alterations and modifications may be made without departing from the invention and therefore it is aimed in the appended claims to cover all such alterations and modifications as fall within the true spirit and scope of the invention.

What we claim as new and desire to secure by Letters Patent of the United States is:

[1. In combination:

(a) a busway having a pair of alternating voltage supply conductors, (b) a plurality of plug-in ballast units for connection to said busway at spaced apart points longitudinally along said busway, (c) a plurality of elongated arc discharge devices mounted longitudinally along said busway in end to end spaced apart relationship, at least one discharge device for each interval between two successive ballast units thereby to provide a common ballast unit for each two longitudinally adjacent discharge devices, and each of said discharge devices having a terminal at either end, (d) each of said ballast units having a pair of input terminals each connected to a corresponding one of said busway conductors and each of said units having first and second output terminals, (e) each of said ballast units comprising a transformer having a primary winding connected to be supplied from said input terminals and a secondary winding included in a connection between said output terminals and (f) electrical connections from the terminals of each of said discharge devices to corresponding output terminals of two corresponding successive ballast units.]

[2. In combination:

(a) a busway having a pair of alternating voltage supply conductors, (b) a plurality of plug-in ballast units for connection to said busway at spaced apart points longitudinally along said busway, (c) a plurality of elongated arc discharge devices mounted longitudinally along said busway in end to end spaced apart relationship, at least one discharge device for each interval between two successive ballast units thereby to provide a common ballast unit for each two longitudinally adjacent discharge devices, and each of said discharge devices having a terminal at either end, (d) each of said ballast units having a pair of input terminals each connected to a corresponding one of said busway conductors and each of said units having first and second output terminals, (e) electrical connections from the terminals of each of said discharge devices to corresponding output terminals of two corresponding successive ballast units, and (f) each of said ballast units comprising (1) a capacitor and (2) a transformer having a primary winding connected to be supplied from said input terminals and a secondary winding connected between said output terminals thereby to complete an energizing circuit for each of said discharge devices through the two ballast units connected thereto and one of said busway supply conductors.]

[3. In combination:

(a) a busway having a pair of alternating voltage supply conductors, (b) a plurality of plug-in ballast units for connection to said busway at spaced apart points longitudinally along said busway, (c) a plurality of elongated arc discharge devices mounted longitudinally along said busway in end to end spaced apart relationship, at least one discharge device for each interval between two successive ballast units thereby to provide a common ballast unit for each two longitudinally adjacent discharge devices, and each of said discharge devices having a terminal at either end, (d) each of said ballast units having a pair of input terminals each connected to a corresponding one of said busway conductors and each of said units having first and second output terminals, (e) each of said ballast units comprising a transformer having a primary winding connected to be supplied from said input terminals and a secondary winding connected to said primary winding in voltage step-up relation, said primary and secondary windings being connected in series in a connection between said output terminals and (f) electrical connections from the terminals of each of said discharge devices to corresponding output terminals of two corresponding successive ballast units thereby to complete an energizing circuit for each of said discharge devices through the two ballast units connected thereto and one of said busway supply conductors.]

[4. In combination:

(a) a busway having a pair of alternating voltage supply conductors, (b) a plurality of plug-in ballast units for connection to said busway at spaced apart points longitudinally along said busway, (c) a plurality of pairs of elongated arc discharge devices mounted in longitudinal end to end relationship on said busway with the devices of each pair being mounted in parallel side by side arrangement, at least one pair of discharge devices for each interval between two successive ballast units thereby to provide a common ballast unit for each two longitudinally adjacent pairs of discharge devices, and each of said discharge devices having a terminal at either end, (d) each of said ballast units having a pair of input terminals each connected to a corresponding one of said busway conductors and each of said ballast units having a pair of first output terminals and a pair of second output terminals, (e) each of said ballast units comprising (1) a transformer having a primary winding connected to said input terminals and a secondary winding connected between a primary winding terminal and one of said second output terminals, (2) a capacitor connected between one of said input terminals and the other of said second output terminals, (3) electrical connections from the terminals of said primary winding to corresponding first output terminals, and (f) electrical connections from the terminals of each of said discharge devices to corresponding output terminals of two corresponding successive ballast units.]

5. [In combination:] *In an electric lighting system of the type including a plug-in type power busway having first and second power conductors, the combination comprising:*

(a) [a busway having a pair of alternating voltage supply conductors,]

[(b)] a plurality of plug-in ballast units plugged into said busway in spaced apart relationship longitudinally along said busway, (*b*) [(c)] a plurality of pairs of elongated arc discharge devices mounted in longitudinal end to end relationship on said busway with the devices of each pair being mounted in parallel side by saide arrangement, at least one pair of discharge devices for each interval between two successive ballast units thereby to provide a common ballast unit for each two longitudinally adjacent pairs of discharge devices, and each of said discharge devices having a terminal at [either] *each* end, (*c*) [(d)] each of said ballast units having a pair of input terminals each connected to a corresponding one of said busway conductors and each of said ballast units having a pair of first output terminals for connection to corresponding terminals of the arc discharge devices of one of said longitudinally adjacent pairs and having a pair of second output terminals for connection to corresponding terminals of the arc discharge devices of the other of said longitudinally adjacent pairs and (*d*) [(e)] each of said ballast units comprising (1) a transformer having a primary winding connected to be supplied from said input terminals and a secondary winding connected to said primary winding in voltage stepup relation, (2) a starting capacitor and a power capacitor connected in series relationship between one of said [output] *input* terminals and one terminal of said secondary winding, (3) an electrical connection from an intermediate point between said capacitors to one of said second output terminals, (4) an electrical connection from the other terminal of said secondary winding to the other of said second output terminals and (5) electrical connections from the terminals of said primary windings to corresponding terminals of said pair of first output terminals.

*6. In an electric lighting system of the type including a plug-in type power busway having first and second power conductors, the combination comprising:*

(*a*) *a plurality of plug-in type ballast units supported on and connected to said busway at longitudinally spaced apart points along said busway;*

(*b*) *a plurality of elongated arc discharge devices having at least one terminal at each end and being mounted on and electrically connected to said ballast units, there being at least one discharge device for each interval between each two successive ballast units, each of said ballast units which is positioned between two successive arc discharge devices serving as a common ballast unit for said successive discharge devices;*

(*c*) *each of said ballast units comprising a housing, a pair of plug-in type input terminals supported on said housing and each connected to a corresponding one of said busway conductors, each of said ballast units having at least two output terminals supported on said housing;*

(*d*) *each of said ballast units further comprising a transformer having a primary winding and a secondary winding and means connecting the ends of said primary winding to said input terminals respectively of said ballast unit, and*

(*e*) *means connecting said primary winding of each of said ballast units electrically in series with one of said elongated arc discharge devices and said secondary winding of the next successive ballast unit.*

*7. The invention as set forth in claim 6 wherein said means connecting said primary winding also includes at least a portion of one of said power conductors of said busway.*

*8. The invention as set forth in claim 6 wherein each of said ballast units comprises:*

(*a*) *two pairs of output terminals, one of said pairs of output terminals being positioned on one side of said housing and the other pair of said output terminals being positioned on the opposite side of said housing;*

(*b*) *at least one pair of elongated arc discharge devices between each pair of successive ballast units, said discharge devices being connected at one end to a pair of output terminals on a side of one of said ballast units and the other end thereof being connected at the other end to a pair of said output terminals on a side of the next successive ballast unit.*

*9. The invention as set forth in claim 8 wherein each of said ballast units includes a capacitor connected electrically in series with said one arc discharge device and in which the other of said arc discharge devices of each pair of devices between adjacent ballast units is electrically connected across said capacitor to be energized thereby when current flows in said first arc discharge device.*

References Cited

The following references, cited by the Examiner, are of record in the patented file of this patent or the original patent.

UNITED STATES PATENTS

| | | | |
|---|---|---|---|
| 2,501,485 | 3/1950 | Tuck | 315—257 |
| 2,637,833 | 5/1953 | Skrotzki. | |
| 2,907,872 | 10/1959 | Wilson | 240—51.11 |
| 2,958,007 | 10/1960 | Karash | 315—100 |
| 3,066,273 | 11/1962 | Herrmann et al. | 240—51.11 X |

JAMES W. LAWRENCE, *Primary Examiner.*

R. F. HOSSFELD, *Assistant Examiner.*

U.S. Cl. X.R.

174—52; 307—157; 315—254, 276, 283